US007952573B2

(12) United States Patent
Golle et al.

(10) Patent No.: US 7,952,573 B2
(45) Date of Patent: May 31, 2011

(54) METHOD AND APPARATUS FOR BILLBOARD WITH ADVERTISEMENT INCLUDING ELECTROLUMINESCENT LIGHTING

(75) Inventors: Aaron J. Golle, Shakopee, MN (US); John T. Golle, Eden Prairie, TX (US)

(73) Assignee: Save Lites, LLC, Eden Prairie, MN (US)

( * ) Notice: Subject to any disclaimer, the term of this patent is extended or adjusted under 35 U.S.C. 154(b) by 181 days.

(21) Appl. No.: 11/999,494

(22) Filed: Dec. 4, 2007

(65) Prior Publication Data

US 2008/0155869 A1 Jul. 3, 2008

Related U.S. Application Data

(60) Provisional application No. 60/868,457, filed on Dec. 4, 2006.

(51) Int. Cl.
*G06F 3/038* (2006.01)

(52) U.S. Cl. ............................ 345/204; 345/76; 40/541

(58) Field of Classification Search .............. 345/76–83, 345/204; 40/541, 546, 584, 606
See application file for complete search history.

(56) References Cited

U.S. PATENT DOCUMENTS

| | | | | |
|---|---|---|---|---|
| 4,541,190 | A * | 9/1985 | Weiner et al. | 40/610 |
| 5,532,711 | A | 7/1996 | Harris | |
| 5,625,968 | A * | 5/1997 | Ashall | 40/546 |
| 5,682,696 | A * | 11/1997 | Gill | 40/607.03 |
| 5,761,839 | A * | 6/1998 | Heikkila | 40/730 |
| 6,397,451 | B1 * | 6/2002 | Gill | 29/469.5 |
| 7,316,491 | B2 | 1/2008 | Golle et al. | |
| 2002/0159245 | A1 * | 10/2002 | Murasko et al. | 362/84 |
| 2004/0001002 | A1 | 1/2004 | Blum et al. | |
| 2004/0045199 | A1 * | 3/2004 | Ki | 40/546 |
| 2006/0111981 | A1 | 5/2006 | Hunter et al. | |
| 2006/0176269 | A1 | 8/2006 | Bergman et al. | |
| 2006/0267788 | A1 | 11/2006 | Delany | |
| 2007/0052636 | A1 * | 3/2007 | Kalt et al. | 345/83 |
| 2010/0043263 | A1 | 2/2010 | Golle | |

FOREIGN PATENT DOCUMENTS

| | | | |
|---|---|---|---|
| WO | WO-2008/070098 | A2 | 6/2008 |
| WO | WO-2008/070098 | A3 | 6/2008 |

OTHER PUBLICATIONS

"U.S. Appl. No. 12/195,006, Restriction Requirement mailed Jun. 22, 2010", 6 pgs.
"U.S. Appl. No. PCT/US2007/024871, International Search Report and Written Opinion, mailed Sep. 29, 2008", 10 pgs.
U.S. Appl. No. 12/195,006, Non Final Office Action mailed Dec. 10, 2010, 9 pgs.

* cited by examiner

*Primary Examiner* — Kimnhung Nguyen
(74) *Attorney, Agent, or Firm* — Schwegman, Lundberg & Woessner, P.A.

(57) ABSTRACT

Method and apparatus provide for attaching a planar electroluminescent lamp unit to the side of a billboard, and providing a media adhered to the surface of the lamp unit and to the side of the billboard adjacent the lamp unit, wherein the media has advertising indicia printed thereon. The lamp unit is connected to a source of power on the billboard.

20 Claims, 10 Drawing Sheets

METHOD AND APPARATUS FOR BILLBOARD WITH ADVERTISEMENT INCLUDING ELECTROLUMINESCENT LIGHTING

RELATED APPLICATIONS

This patent application claims the benefit of priority, under 35 U.S.C. Section 119(e), to U.S. Provisional Patent Application Ser. No. 60/868,457, filed on Dec. 4, 2006, which is incorporated herein by reference.

FIELD OF THE INVENTION

The inventive subject matter relates to method and apparatus for providing outdoor or out-of-home advertising such as a billboard with media carrying an advertisement, such as one or more images and/or text for the advertisement, wherein there are provided electroluminescent portions of the advertisement.

BACKGROUND

Out of home advertising, such as billboard advertising, is an important and pervasive advertising medium. Creating imaginative and compelling advertising messages and displays for out of home advertising is a constant objective of the advertising industry.

DETAILED DESCRIPTION OF THE INVENTION

Figure 1A:
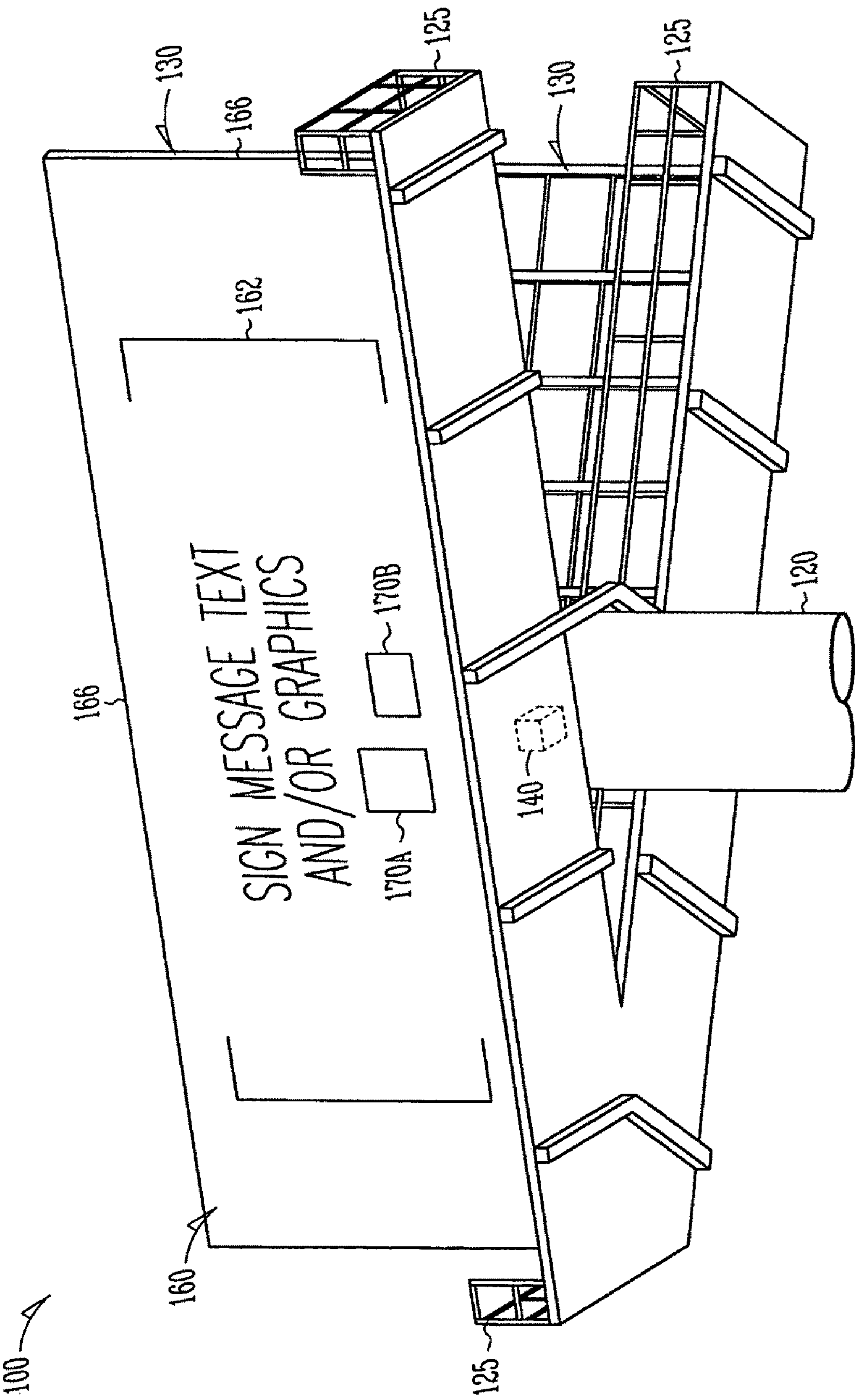
FIGS. 1A and 1B illustrate an illuminated sign for a billboard according to one example embodiment of the inventive subject matter.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical changes, etc. may be made without departing from the scope of the present invention.

According to one example embodiment, there is provided a system and method for electroluminescent (EL) active illumination for outdoor advertising applications, and in particular billboards, according to the inventive subject matter described herein. According to one example embodiment, an EL active illumination system according to the inventive subject matter described herein may be designed to complement traditional advertising production.

Figure 1B:
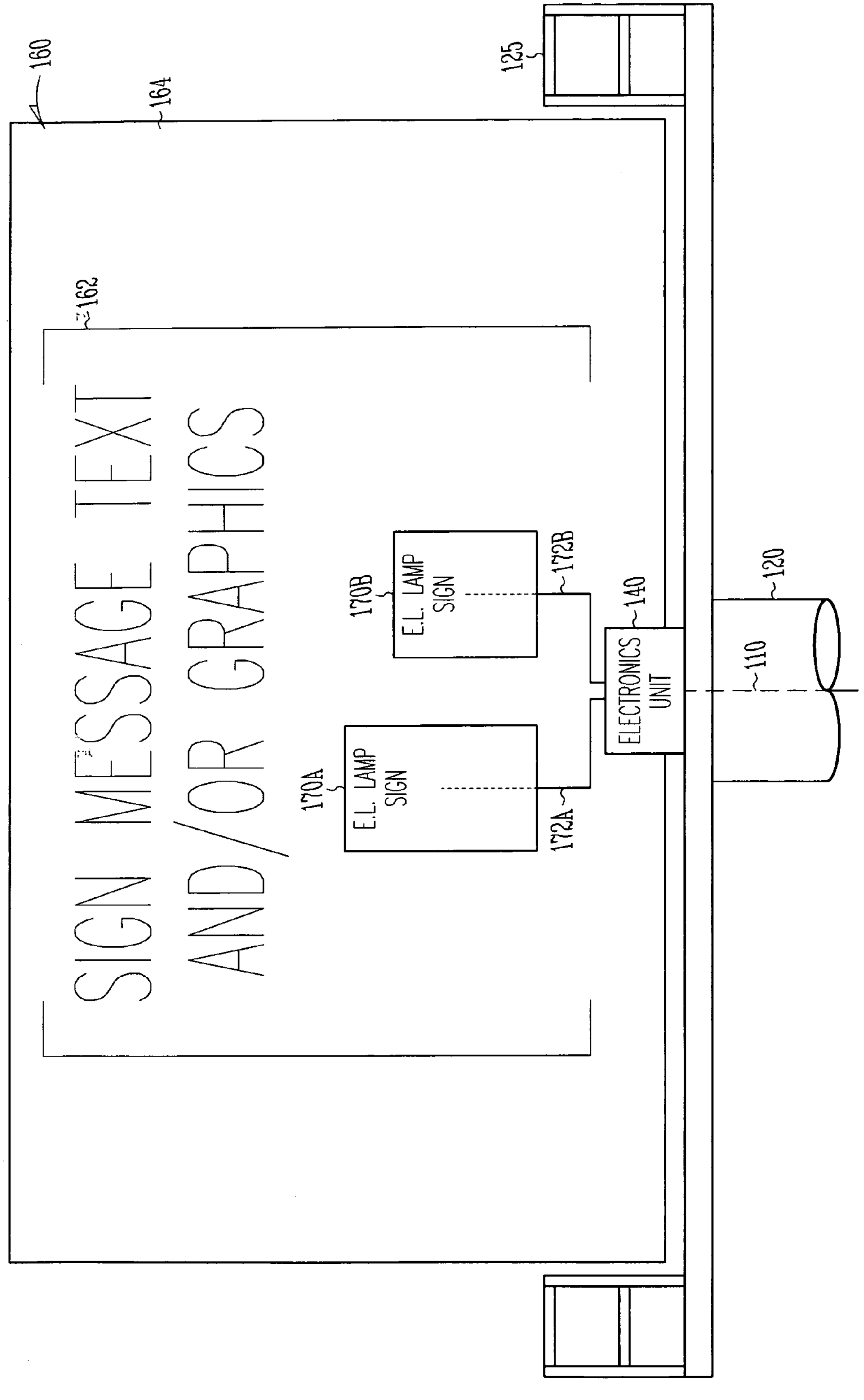

Referring now to FIGS. 1A and 1B, there is illustrated a first example embodiment of a billboard sign system 100 and method for installing and using the same. A billboard support structure 120, in one embodiment, includes, in this embodiment, two sign frames 130 supported on the support structure 120. Structure 120 may include one or more vertical support members, such as columns or a support frame. A catwalk 125 may also be provided on the support structure 120 to be used by sign installation personnel.

Figure 3:
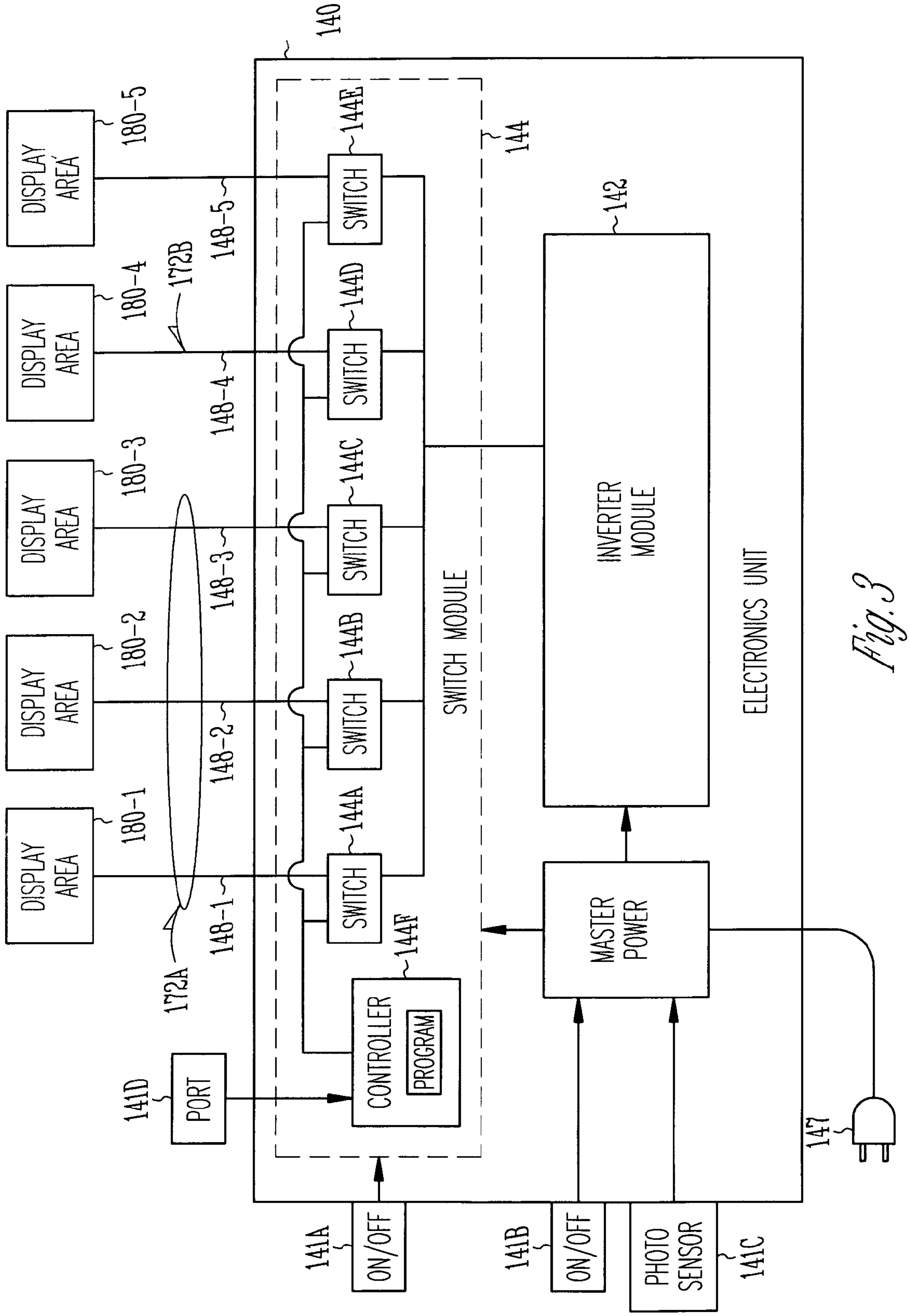

A sign frame 130 is used to support an EL-illuminated billboard sign 160 which may be mounted on the sign frame 130. In one embodiment, the EL-illuminated sign 160 includes sign indicia 162 printed or otherwise carried on a vinyl substrate 164 (for example a vinyl sheet or panel) that is stretched on the frame 130, for example from the edges 166 of the sign 160. In one example embodiment, two EL lamp signs 170A and 170B, collectively or individually referred to sometimes as signs 170, are attached to the vinyl substrate 164. Each of signs 170A and 170B is connected to an electronics unit 140 through a respective wiring harness or bundle 172A and 172B. A source of electrical power 110 is used to provide power to an electronics unit 140. As illustrated in FIG. 3, electronics unit 140 includes an inverter module 142 and an switch module 144.

Figure 2A:
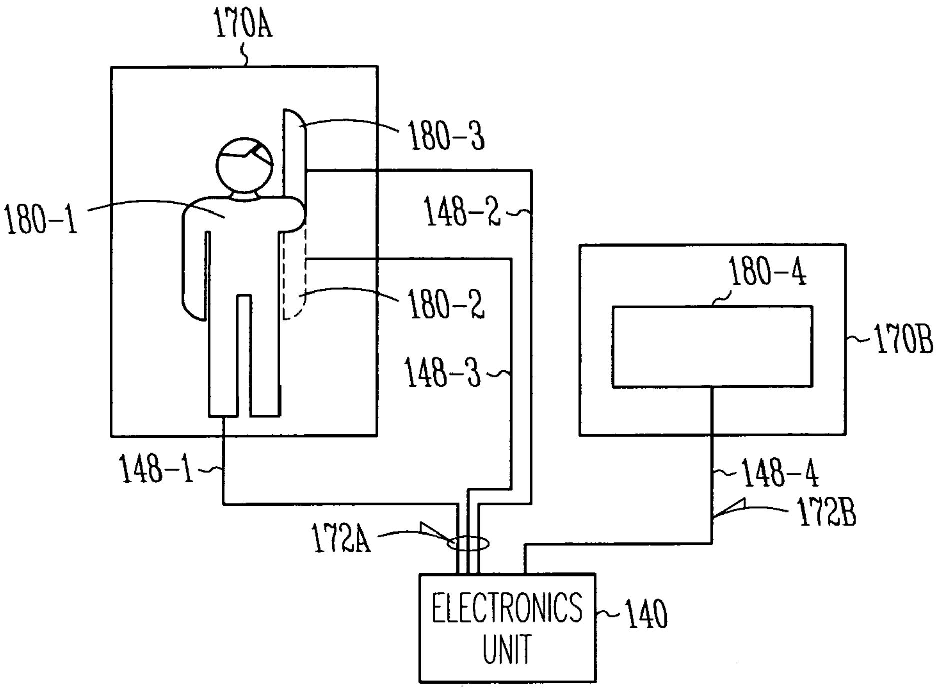
FIGS. 2A, 2B and 3 illustrate apparatus for illuminating a billboard sign according to one example embodiment of the inventive subject matter.

As illustrated in FIG. 2A, in one example embodiment, one of the signs 170A is a character 180 and one of the signs 170B is a smaller logo 182. Sign 170A may include three separate EL illuminated areas and circuits for providing power thereto. A first area 180-1 depicts the body of the character and one arm (left from viewing perspective); a second area depicts an arm 180-2 of the character 180 in a down position; and a third area depicts an arm 180-3 of the character 180 in an up position. A fourth display area 180-4 on sign 170B may also be illuminated. Each area 180-1, 180-2, 180-3 and 180-4 is supplied with a source of power independent of the other, for example through respective circuits 148-1, 148-2, 148-3 and 148-4, allowing the areas to be illuminated independently of one another. This independent illumination may be used to create an animation effect.

Figure 2B:
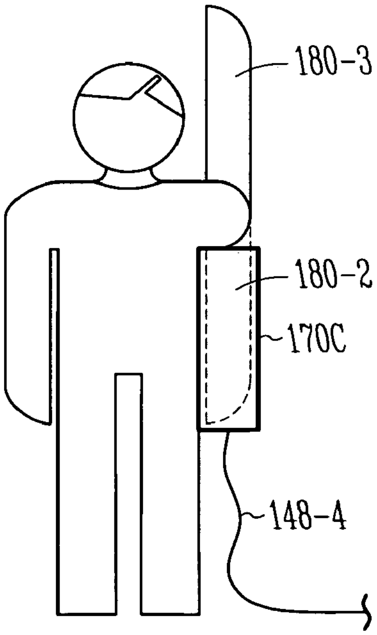

According to still another example embodiment illustrated in FIG. 2B, a polarizing panel 170C may be attached to the billboard directly over the arm area 180-2. The panel is electrically activated to pass or block light and may be selectively turned on or off, for example by switch module 144, and in particular the switch 144*e* for instance, to either pass or block light. When the light is blocked, the area of the panel appears dark, for example black or gray, and hides the arm area 180-2 beneath it. When light is allowed to pass, the arm below is visible. Panel 170C, in one embodiment, is flexible, and may be constructed in the same manner with electrical strain relief and low tack and high tack adhesive components as illustrated with respect to signs 170A and 170B.

As illustrated in FIG. 3, according to one example embodiment, the switch module 144 selectively connects the power from inverter module 142 to the circuits 148-1, 148-2, 148-3 and 148-4 through switches 144*a* through 147*e*. According to another example embodiment, the switches may be deployed remotely from the unit 140. Switches 144*a*-144*e* are in turn controlled by a computer control device or other controller device 144*f* that may sequentially or simultaneously, in any desired order or combination, activate switches 144*a* through 147*e*, for example to provide steady state supply of power to some or all display areas 180, or animation thereof.

In one embodiment, the switching or animation function may be activated or deactivated, for example through a switch input 141*a* to switch module 144, wherein the switch may be accessible on the outside of the housing 145. Further, the master power to unit 140 may be turned on or off using a switch 141*b* that is input to the master power module 143. Master power module 143 may receive line voltage from a plug 147 connected to a source of power, or power to module 143 may be provided from other sources as described further below. Further, when the unit 140 is activated, an electric eye or photosensor 141*c* provides a control input to the master power module 143 or unit 140, in order to turn the unit on at the onset of darkness and turn it off at the onset of light, for example in the morning. According to another embodiment, the activation or deactivation of the supply of power to the display areas 180 may be accomplished by other configurations of the electronics unit 140. According to one embodiment, the electric eye 141*c* may be exposed to ambient light through a port or aperture or window in the weatherproof housing. According to one example embodiment, the exposure of the photocell should be to direct sunlight when the housing is positioned in the field. Further, the photocell 146 should be positioned to avoid illumination from artificial lights. Such illumination may prevent the photocell from detecting a change from daytime to nighttime.

In one embodiment, the switches may be activated so as to create an animation effect on the display or combination of displays. In another embodiment, each switch may be activated in sequence and left on until all other switches are activated, and leaving all activated for a period of time until all are deactivated. In one animation sequence, the display area 180-1 is continuously illuminated through power supplied through circuit 148-1. Supply of power to the arm areas 180-2 and 180-2 may be alternated, for example every ten (10) seconds, to create the appearance that the arm is moving from the down to the up position and back. Arm motion is thus animated. According to one embodiment, the animation is programmed for a 10 second sequence. Other sequences may be provided by programming the switch module 144 by uploading a new program into the module, for example using a memory stick or other media that may store a program that may be read into the switch module through a port 141*d*, for example using a universal serial bus and a corresponding USB connector at the physical interface, which may be adjacent the controller or have a port on the surface of the housing 145. According to another example embodiment, a ground fault switch may be provided in the circuit supplying line voltage to the unit 140, and be adapted to reset automatically, such as in one minute, following a ground fault that trips the switch off.

Figure 4A:
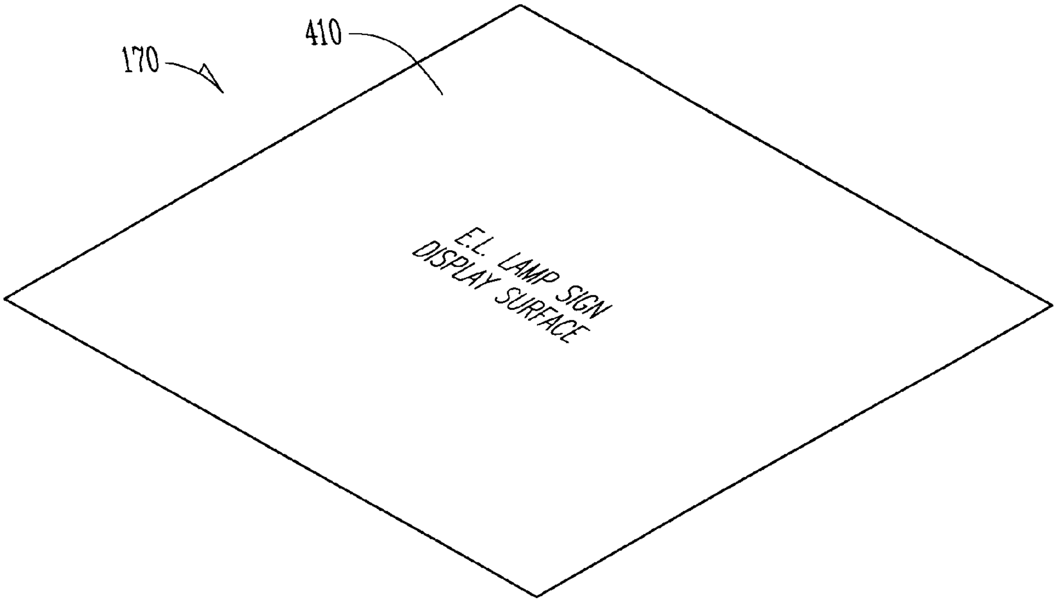
FIGS. 4A and 4B illustrate the construction of an EL lamp sign according to one example embodiment of the inventive subject matter.
Figure 4B:
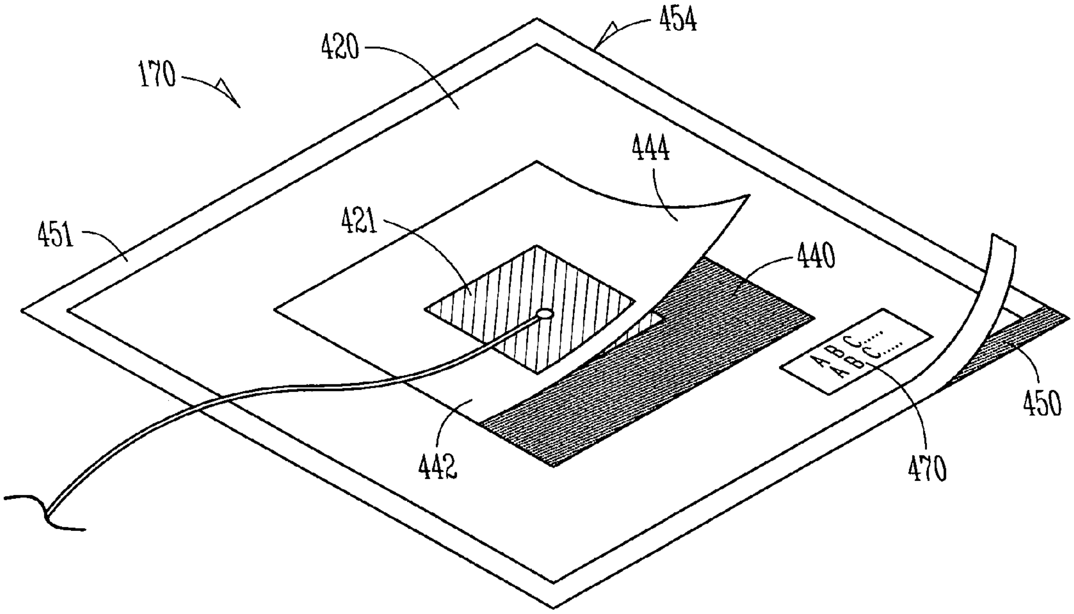

In one example embodiment illustrated in FIGS. 4A and 4B, each EL lamp sign 170, and particular EL lamp components in the signs, are constructed from flexible materials, such as polymers and/or materials used for flexible printed circuit boards, such that the units 170 may be folded or rolled. A wiring harness 172 (for example 172A or 172B), including wiring for the circuits (such as circuits 148-1, 148-2, 148-3 and 148-4) supplying power to the EL lamp signs, may be connected to the sign 170 in the center of the back of the unit, optionally mechanically secured using a strain relief mechanism 421 in the form of a thicker plastic, rubber or polymer member that is adhered to the back 430 of the EL lamp sign, and supplies power to the respective areas 180-1, 180-2,

180-3 or 180-4. The wiring harness 172 is connected to the electronics unit 140. If the EL lamp sign 170 is attached to the billboard sign 160 in a position above the electronics unit 140, the wiring harness 172 is run downward under the sign (sandwiched between the sign 170 and the underlying vinyl sign, and if the attached in a position below the electronics unit 140, the wiring 172 is run upward to the module 140 under the sign 170. According to still another example embodiment, all wiring from the EL lamp signs should be secured with fasteners or tape such as snaps, clips or colored or clear tape to conceal them to the billboard graphics. These fasteners may be included with the billboard vinyl billboard sign provided for the sign installation. According to one example embodiment, harness 172 takes the form of a flat cable with multiple conductors arranged side by side along the length of the cable.

According to still another example embodiment, the inverter module 142 and switch module 144 may be provided as an integrated module that may be inserted or installed in the electronics unit 140, so that additional power and switching capability may be added to the unit 140 by installing another such module.

Further, in one embodiment the electronics unit 140 has a corresponding female connector for each sign wiring harness 172 (which may for example be identified as "A" or "B"). According to one embodiment, the connectors on the electronics unit 140 are designed to fit only the appropriate respective connectors on the wiring harnesses for the respective signs, for example signs 170A and 170B.

In one embodiment, illustrated in FIG. 4B, a low tack "positioning adhesive" 440 is located in the middle 442 of the back of the EL lamp sign 170, around the strain relief member 421, and is covered by a release paper 444 that may be pulled off when the adhesive is to be used to position the sign. The low tack adhesive is adapted to allow the sign to be stuck to the vinyl sign 160 but still be moved to make adjustments to its position, for example by sliding it along the surface of the sign 160 or rotating it to move it up or down or side to side or about its center, or be pulled off and reapplied. High tack adhesive 450 is also included on the back of the EL lamp sign and is covered with release paper 451. According to one embodiment, the high tack adhesive is disposed around the perimeter 454 of the sign. Once the sign is properly positioned using the low tack adhesive, the release paper on the high tack adhesive is removed and the sign 107 is adhered to the billboard sign using the high tack adhesive. In one embodiment, vinyl billboard sign 160 may be prepared for installation of an EL lamp signs 170 using a cleaner to prepare the vinyl to adhere to the EL lamp signs 170. According to one embodiment, a solution of 50% water and 50% isopropyl alcohol may be used, but any other workable solution may be substituted.

Further, according to one example embodiment, each EL billboard sign 170 will have a sticker 470 on the back that will indicate by market and by location where that sign should be posted, and for example may be assigned a number that correlates to a specific billboard location.

Figure 5:
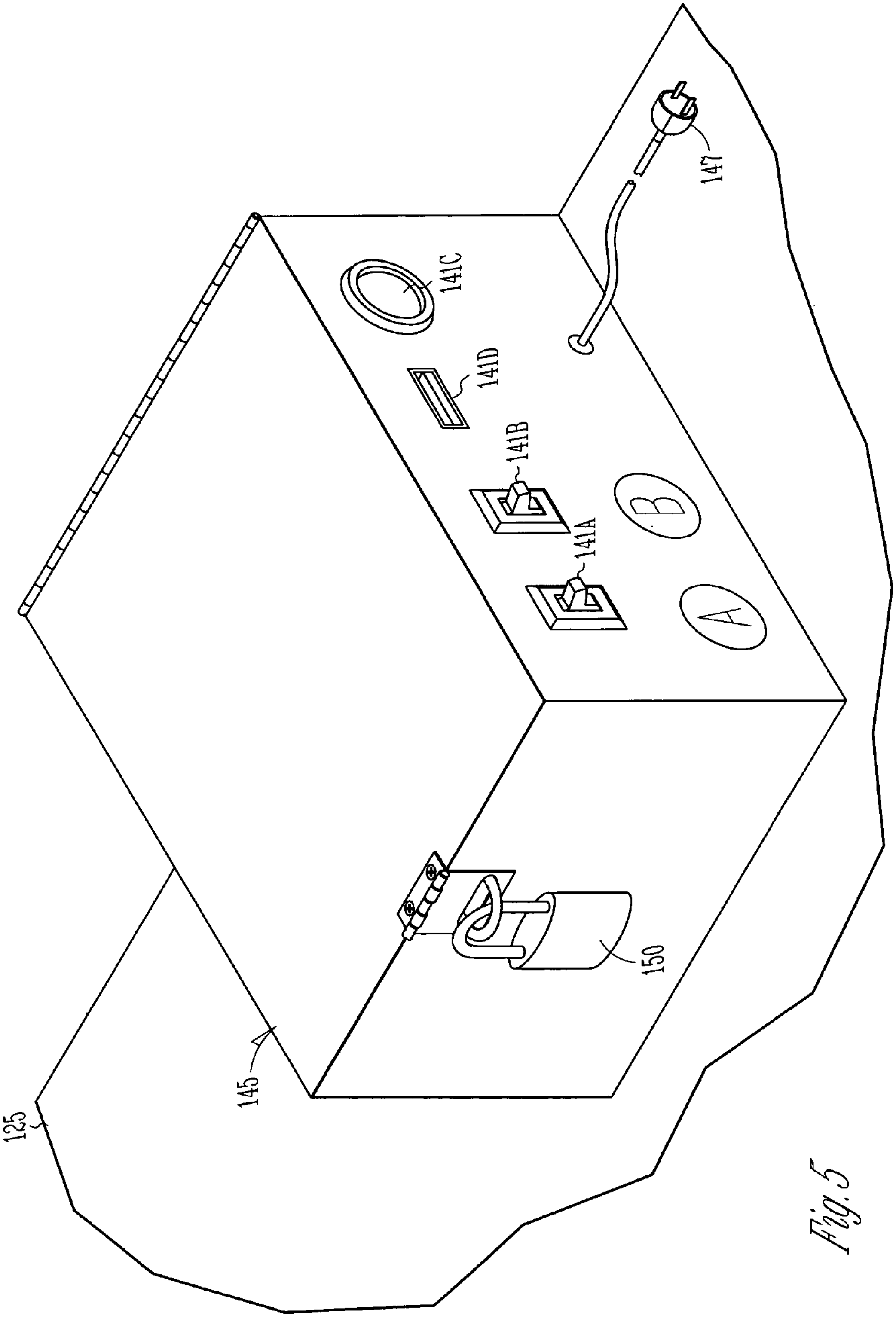
FIG. 5 illustrates a housing for an electronics unit for an EL illuminated sign according to one example embodiment of the inventive subject matter.

As illustrated in FIG. 5, in one embodiment, the electronics unit 140 is mounted near the frame 130 inside a housing 145. Housing 145 may be secured to the billboard support structure 120, such as the catwalk 125 behind or in front of the billboard, or any other structure near the billboard such as on a rooftop. According to one embodiment, housing 145 is a weather-proof box, and includes fire, moisture, and other protections designed into the housing 145. If the housing 145 is located in an unsecured area, a pad lock 150 may be required to secure the housing to ensure the electronics unit 140 are protected from tampering.

The power source 110 may be provided proximate the frame system 130 to provide power to the electronics unit 140. In one embodiment, the power source is line voltage, for example 115/120V AC power in the United States, or higher or lower voltages in other countries, with a ground (for example three prongs). According to another embodiment, the power source 110 may be a DC power source such as a battery, for example an automobile battery voltage such as 12V DC, or any other DC voltage. According to another embodiment, the battery may be recharged using solar power, such as may be provided by a solar power device positioned to collect solar energy and convert it to a charging current that may be applied to the battery. According to one embodiment, the electronic modules 140 is mounted under or on the bottom of the billboard frame 130, and in another embodiment may be mounted over or on top of the billboard frame 130 (more likely for wall billboards where the electronics may be mounted on a roof above the sign). According to one example embodiment, there may be two different sizes of the EL electronics units 140, one for EL lamp signs that are 20'×20' or 25'×25' dimensions, and one for signs of smaller dimension.

Figure 6:
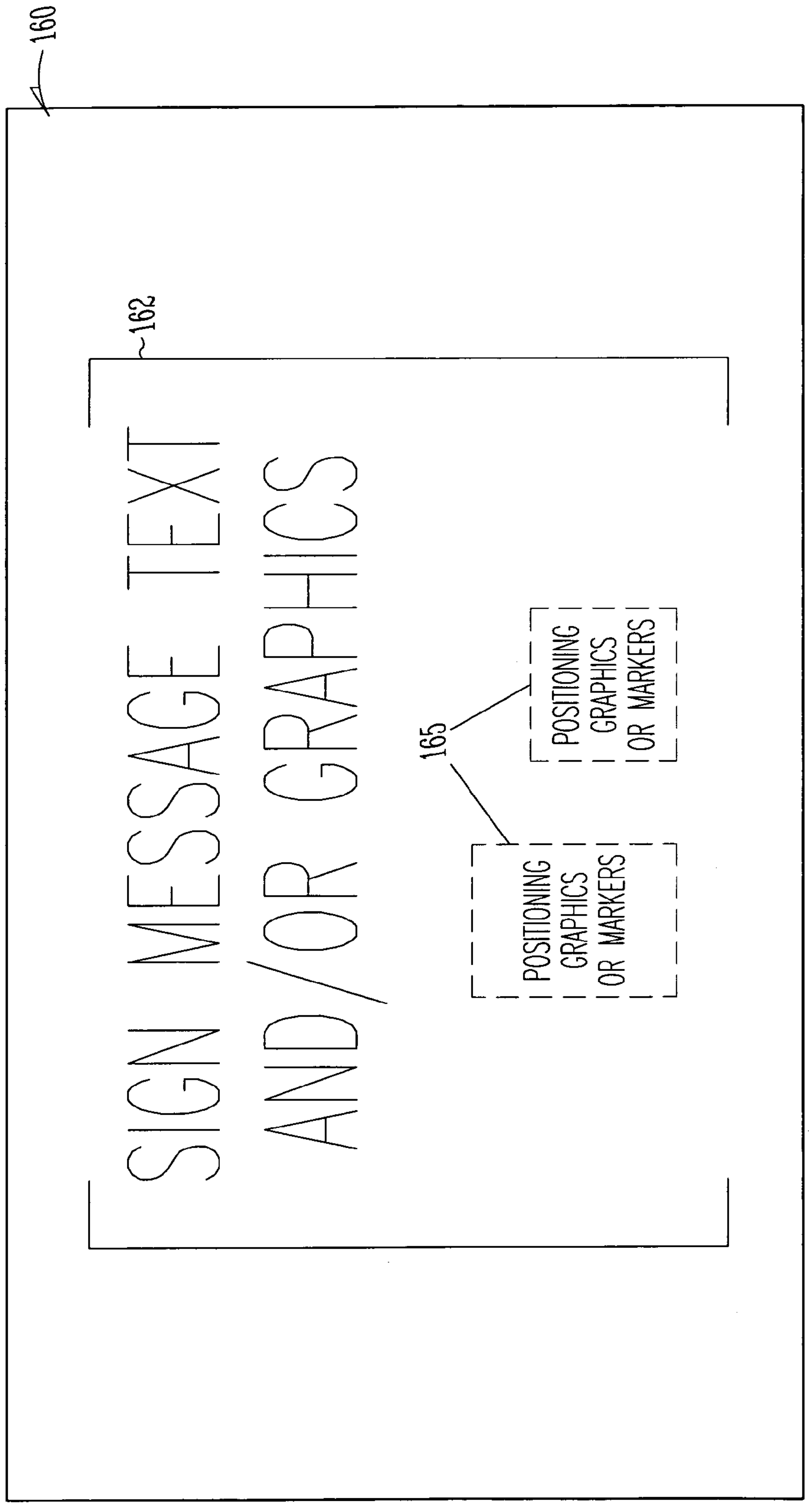
FIG. 6 illustrates a sign with registration indications for EL lamp signs according to one example embodiment of the inventive subject matter.

According to one embodiment, the EL lamp signs 170 may be attached before the vinyl billboard sign 160 is attached to the frame 130. According to one example embodiment, as illustrated in FIG. 6, the EL indicia 162 includes graphics and/or alignment markers 165 on the sign that show where the EL lamp signs 170 are to be positioned on the sign 160, and that are covered by the signs 170 when applied. The graphics and/or markers may serve as a guide for where the EL lamp signs 170 will be set.

Figure 7:
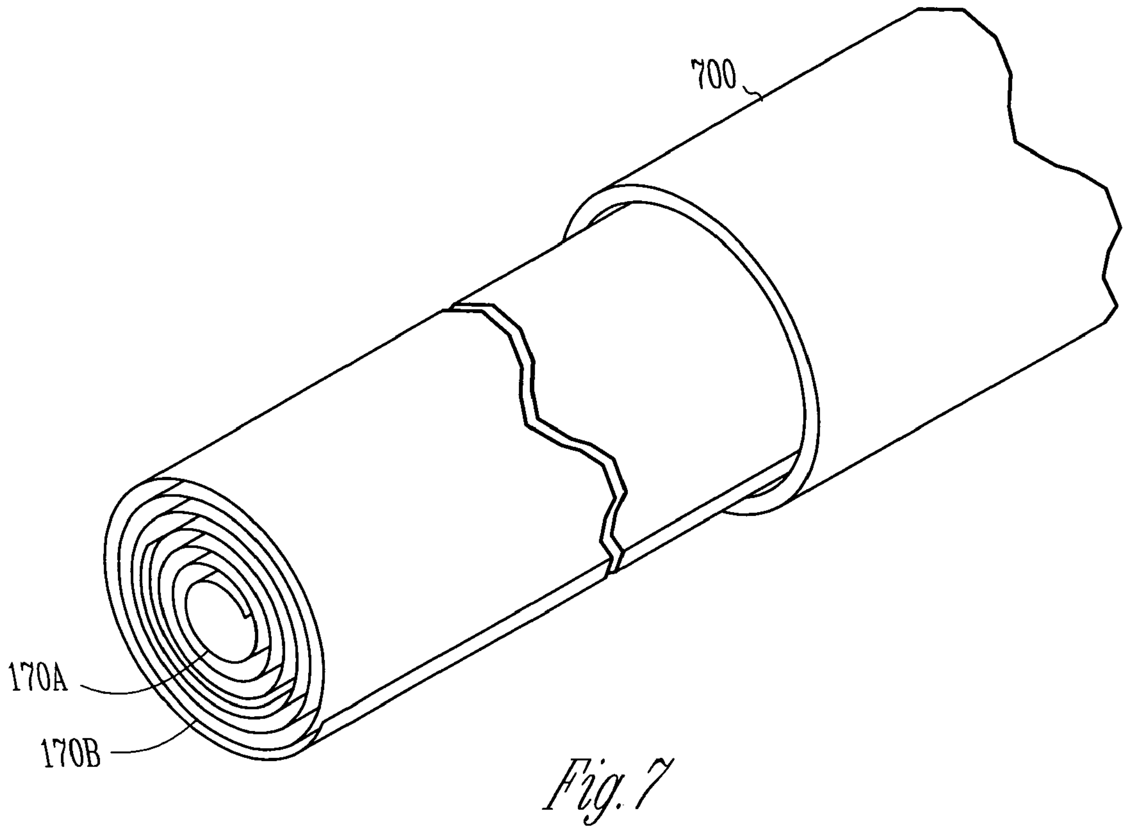
FIGS. 7 and 8 illustrates apparatus and method for an EL illuminated sign according to one example embodiment of the inventive subject matter.

According to one example embodiment shown in FIG. 7, one or more, for example up to five (5) EL lamp signs 170, may be stored and transported in a cylindrically shaped container (tube) 700. In FIG. 7, lamp signs 170A and 170B are shown rolled up in tube 700. According to one example embodiment, the tube 700 may measure approximately 13 feet long and up to 24 inches diameter. At least one of the signs 170 in this example embodiment has an EL lamp size up to approximately 12'×12'. In another embodiment, the signs may be As described above, each EL lamp sign 170 is fabricated from flexible material so that it may be rolled up for storage in a container 700 with the graphics facing to the outside of the roll to minimize the risk of damage from rolling the signs.

Figure 8:
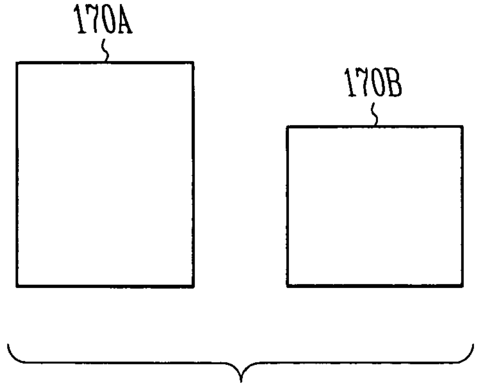

According to one embodiment EL lamp signs 170 may be combined into groups or sets that are used in combination for a particular advertising application. For example, a set may comprise the two EL lamp signs 170A and 170B, for example as illustrated in FIG. 8. As illustrated in FIG. 8, one of the signs A is a character and one of the signs B is a smaller logo. According to one embodiment, two of packages may be stored and transported in a container 700.

According to one example embodiment, one or more electronic units 140 and signs 170 are shipped to a desired destination, with the signs packaged in the container 700. Once the container 700 is received, each sign 170 may be unpacked and inspected it to ensure that it was not damaged in transit, and to confirm that the signs 170 match the market and location(s) they have been shipped to or are intended for. According to one example embodiment, each EL lamp sign 170 is unrolled on a flat surface (preferably indoors in a warm area, for example approximately 60-80 degree Fahrenheit ambient) and allowed to relax for a period of time, for example at least about 30 minutes or more. Preferably but not by way of limitation, each sign 170 should be placed face down—that is the front of the sign is facing the flat surface. According to one example embodiment, the wiring connections may be connected to the electronics unit 140 to ensure that the signs work properly prior to installing.

Figure 9:
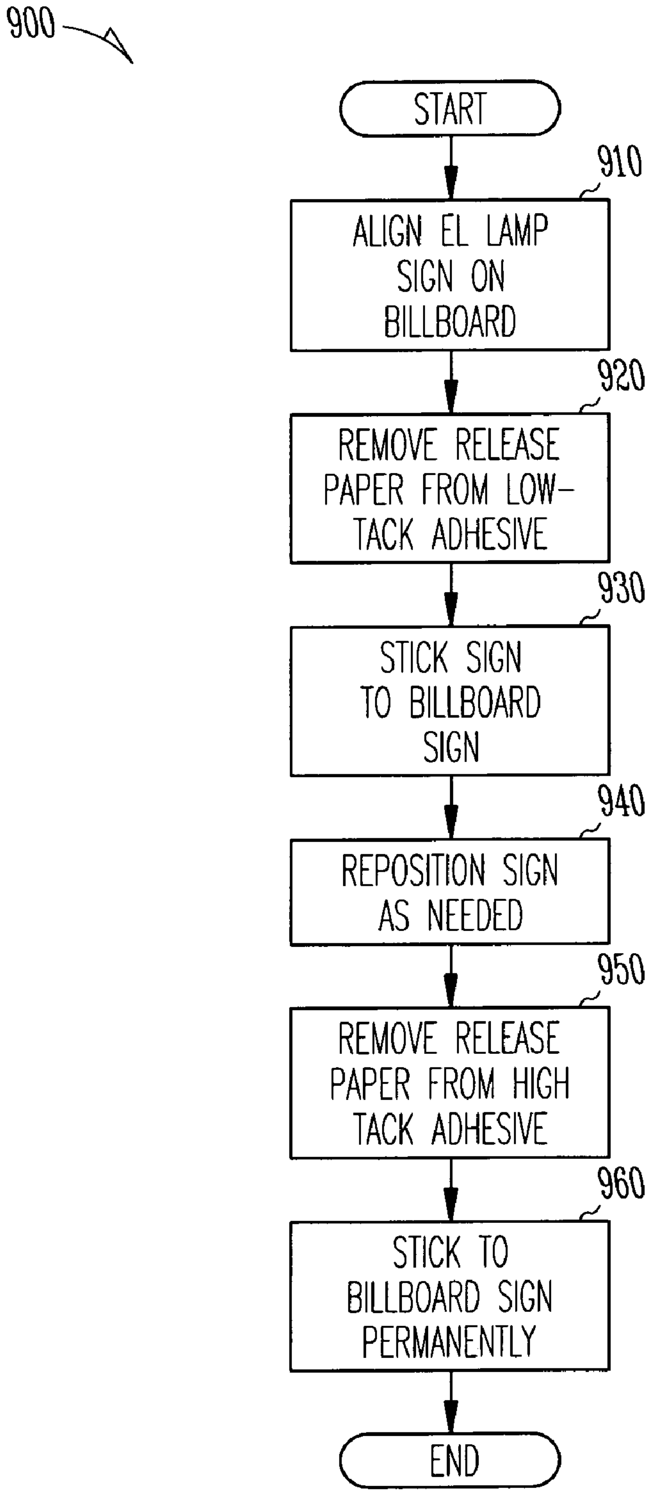
FIG. 9 illustrates a method according to one example embodiment of the inventive subject matter.

Thus, according to one example embodiment of a method 900 illustrated in FIG. 9 according to the inventive subject matter, an EL lamp sign 170 is first aligned 910 on the sign 160. Once the EL lamp sign is aligned correctly, the release paper is pulled off and removed 920, exposing the low tack positioning adhesive 172 located in the middle of the back of the sign. The EL lamp sign 170 is then stuck 930 to the sign 160 and, as necessary only, moved or adjusted 940 until the positioning is acceptable. The high tack adhesive 440 is then exposed by removing 950 the release paper and the sign 170 is then pressed 960 onto the sign 160 to adhere 970 it on the sign 160.

According to one example embodiment, the method provides for adhering the EL lamp signs 170 to the vinyl billboard sign 160 using the low tack adhesive before it is mounted on the billboard frame. The sign 160 with the EL lamp sign 170 may then be rolled up for transport to the billboard framed, preferably according to one embodiment with the graphics on the sign 170 facing out. After the billboard vinyl billboard sign is installed on the billboard, and is stretched tight, the release paper covering the high tack adhesive is removed and the sign is further adhered to the sign 160 using the high tack adhesive. Thus, according to one embodiment, the low tack adhesive is formulated so that the EL lamp sign 170 stays adhered sufficiently to the sign vinyl while and when it is stretched so that the sign 170 does not fall off prior to it being permanently adhered to the sign using the high tack adhesive. As noted above, the high tack adhesive is disposed around the perimeter of the sign. Once adhered with the high tack adhesive, the position of the EL lamp sign 170 is substantially or completely fixed in position.

According to one example embodiment, the electronics unit 140 may be owned by a first entity different than the owner or operator of the billboard on which it is deployed. The electronics unit 140 may be installed at a billboard location, for example on the frame 130 as described above, and remain at the designated site for example to be used with successively different signs 160 and EL lamp signs 170.

In another example embodiment, the EL lamp signs 170 may be mounted on other sign surfaces or media, such as paper posters glued to wood, metal, mesh or plastic billboard backing. Or, the posters may be made of any other material or supported using other billboard systems.

Figure 10:
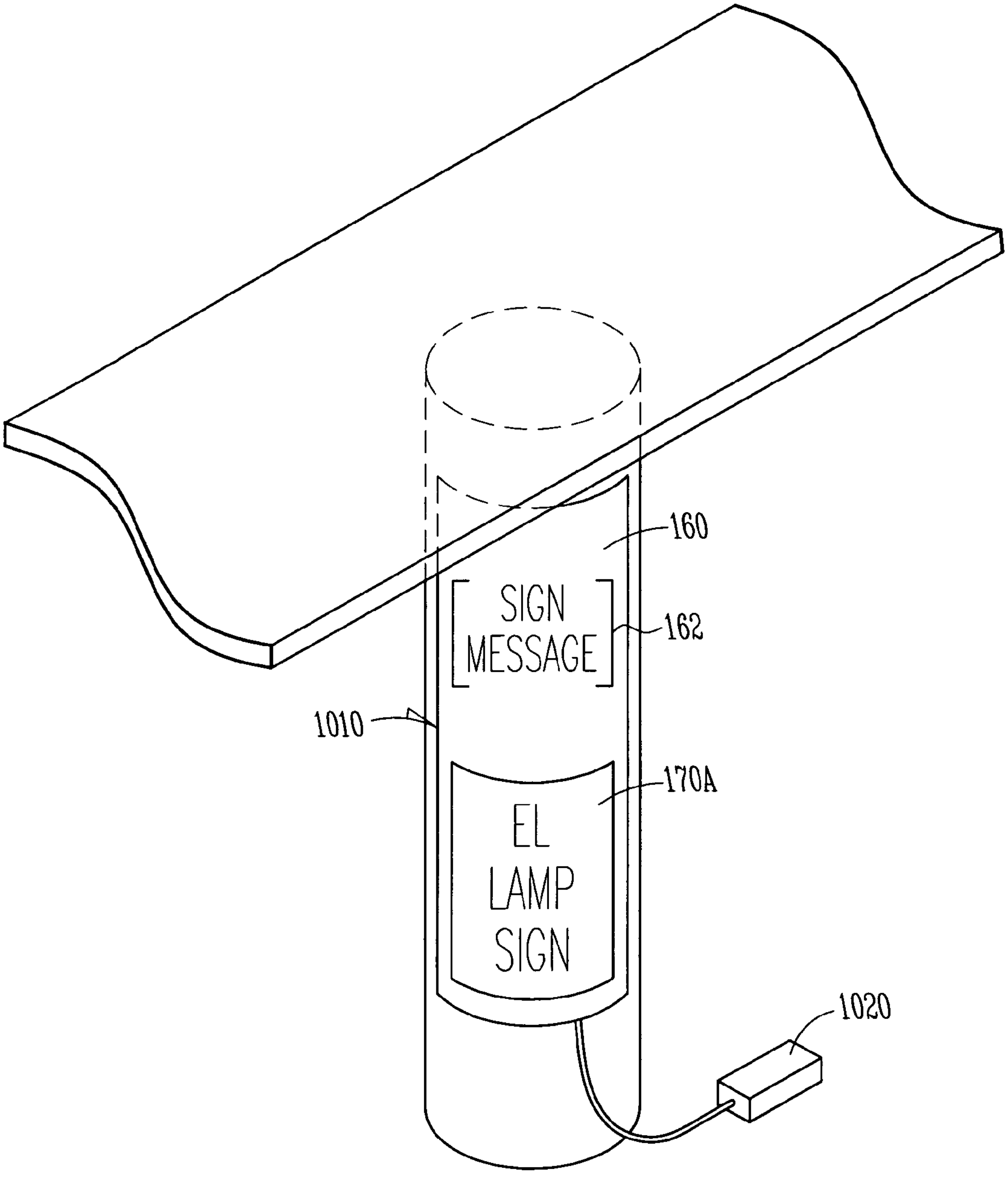
FIG. 10 illustrates an application of an EL sign around a curved surface according to one example embodiment of the inventive subject matter.

According to still another example embodiment illustrated in FIG. 10, a sign 160 with at least one flexible EL lamp sign such as sign 170A is wrapped around a circular column 1010 or other curved or surface with one or more corners, and powered by a power unit 1020 that includes at least a battery (that may be rechargeable), an inverter module and optionally a switch module. In another embodiment, the sign 160 may be omitted, and only the EL lamp sign wrapped or mounted on the column. Unit 1020 may be adhered or otherwise fastened to the column 1010, or be positioned in the floor or ground adjacent the column 1010. In another embodiment, the power unit 1010 may be provided remotely from the column with low power voltage to power the lamp sign running to the column on the floor, overhead or along walls.

According to one example embodiment, the signs 170 include planar EL lamps that may be illuminated with white or light colored EL lamp elements. According to one example embodiment, the white or color may be produced by the EL light produced directly by the fluorescing elements in the lamps or by the light produced by the lamp filtered through a colored transparent overlay, for example but not limited to as shown in U.S. Pat. No. 6,769,138 to Golle, incorporated herein by reference. These white or colored lamps are used alone or in combination with colored transparent overlay that may function as a lens and which may be illuminate with the EL lamp element to produce a color the same or different from the color of the colored overlay and/or the color of the EL luminescence. In one embodiment, the EL lamps are formed in the shape of the alphanumeric characters of sign indicia. Such lamps may be formed for example using a silk-screening process, or any other process now known or later discovered. In another embodiment, the lamps may be covered with a mask that exposes only the alphanumeric characters of sign indicia, such that the entire surface area of the lamps illuminate with EL light but only the area exposed the mask is visible. Further, in another embodiment, the EL lamp signs may be linear and/or tubular, for example in the form of EL illuminated "rope" that may have one or more segments each independently controlled for illumination, for example so as to allow the segments to be consecutively illuminated to create the appearance of movement, in any manner imaginable.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

The invention claimed is:

1. Apparatus comprising:

a billboard sign including an electroluminescent (EL) portion to be illuminated by EL shining through the billboard sign and a portion other than the EL portion; and at least one electroluminescent (EL) lamp sign affixed to the billboard sign to illuminate the EL portion, the EL lamp sign including at least one circuit to receive power to illuminate the sign and at least one portion of an outward facing surface illuminated by EL light, wherein the EL lamp sign is affixed to the EL portion of the billboard sign with a first relatively low tack adhesive and a second relatively high tack adhesive disposed along a perimeter around the first relatively low tack adhesive.

2. The apparatus of claim 1, wherein the second relatively high tack adhesive is disposed completely around the first relatively low tack adhesive.

3. The apparatus of claim 1, further comprising an electronics unit coupled with the billboard sign and including:

an inverter to provide a source of alternating current power for the at least one EL lamp sign;

one or more switches to supply power independently to the at least one EL lamp sign; and a controller to activate the switches selectively in accordance with a program to animate the billboard sign by illuminating the at least one EL lamp sign according to the program.

4. The apparatus of claim 3, further comprising at least one input to receive program information through which the program may replaced or modified.

5. The apparatus of claim 3, further comprising a photosensor to provide a control input to the controller to turn the inverter on at the onset of darkness.

6. The apparatus of claim 5, wherein the control input is to turn the inverter off at the onset of light.

7. A billboard sign comprising:

a vinyl billboard sign including an electroluminescent (EL) portion to be illuminated by EL shining through the vinyl billboard sign and a portion other than the EL portion;

at least one electroluminescent (EL) lamp sign affixed to the vinyl billboard sign to illuminate the EL portion, the EL lamp sign including at least one circuit to receive power to illuminate at least a portion of an outward facing surface illuminated by EL light, wherein the EL lamp sign is flexible and affixed to the EL portion of the vinyl billboard sign with at least a relatively low tack adhesive that allows the EL lamp sign to move relative to the surface of the billboard sign while maintaining enough adhesion to the surface of the billboard sign to at least partially maintain it in place, with a second relatively high tack adhesive disposed along a perimeter around the relatively low tack adhesive to restrict movement of the EL lamp sign with respect to the vinyl billboard sign.

8. The billboard of claim 7, wherein the second relatively high tack adhesive is disposed completely around the relatively low tack adhesive.

9. Apparatus comprising:

a flexible billboard sign including an electroluminescent (EL) portion to be illuminated by EL shining through the billboard sign and a portion other than the EL portion;

at least one electroluminescent (EL) lamp sign affixed to the billboard sign to illuminate the EL portion, the EL lamp sign including at least one circuit to receive power to illuminate at least a portion of an outward facing surface illuminated by EL light, wherein the EL lamp sign is flexible and affixed to the billboard sign with at least a relatively low tack adhesive that allows the EL lamp sign to move relative to the surface of the billboard sign while maintaining enough adhesion to the surface of the billboard sign to at least partially maintain it in place, with a second relatively high tack adhesive disposed along a perimeter around the relatively low tack adhesive to restrict movement of the EL lamp sign with respect to the billboard sign.

10. Apparatus according to claim 9 wherein the billboard sign is vinyl.

11. The apparatus of claim 9, wherein the second relatively high tack adhesive is disposed completely around the relatively low tack adhesive.

12. Apparatus comprising:

at least one flexible assembly including:

a planar flexible vinyl billboard sign including an electroluminescent (EL) portion to be illuminated by EL shining through the billboard sign and a portion other than the EL portion; and at least one planar flexible electroluminescent (EL) lamp sign affixed to the flexible billboard sign to illuminate the EL portion, the at least one planar flexible EL lamp sign affixed to the flexible billboard sign with at least a first adhesive and a second adhesive with a higher tack than the first adhesive, the second adhesive disposed along a perimeter around the first adhesive, the EL lamp sign including at least one circuit to receive power to illuminate at least a portion of an outward facing surface illuminated by EL light, wherein the flexible vinyl billboard sign can be stretched over a billboard frame.

13. The apparatus of claim 12, wherein the second adhesive is disposed completely around the first adhesive.

14. Apparatus comprising:

a shipping or storage tube;

at least one flexible assembly including;

a planar flexible vinyl billboard sign including an electroluminescent (EL) portion to be illuminated by EL shining through the billboard sign and a portion other than the EL portion; and at least one planar flexible electroluminescent (EL) lamp sign affixed to the flexible billboard sign to illuminate the EL portion, the at least one planar flexible EL lamp sign affixed to the flexible billboard sign with at least one low tack adhesive adhering the EL lamp sign to the planar flexible vinyl billboard sign, the EL lamp sign having at least one circuit to receive power to illuminate at least a portion of an outward facing surface illuminated by EL light, with a second relatively high tack adhesive disposed along a perimeter around the at least one low tack adhesive, wherein the flexible vinyl billboard sign can be stretched over a billboard frame; and wherein the flexible assembly is rolled up and disposed in the shipping or storage tube.

15. A billboard system comprising:

a billboard frame;

a billboard sign mounted to the billboard frame;

one or more electroluminescent (EL) lighting elements, wherein an EL lighting element is affixed to the billboard sign with a first relatively low tack adhesive and a second relatively high tack adhesive disposed along a perimeter around the first relatively low tack adhesive; and an electronics unit mounted proximate the billboard sign and including:

an inverter to provide a source of alternating current power for the EL lighting elements;

one or more switches to supply power independently to each of the one or more EL lighting elements;

a controller to activate the switches selectively in accordance with a program to animate the billboard sign by illuminating the one or more EL lighting elements according to the program; and at least one input to receive program information through which the program may replaced or modified.

16. Apparatus comprising:

a billboard sign;

at least one electroluminescent (EL)lamp sign affixed to the billboard sign, the EL lamp sign having at least one circuit to receive power used to illuminate the sign and at least one portion of an outward facing surface illuminated by EL light; and a panel attached over at least a portion of at least one of the EL lamp signs, wherein the panel includes a polarizing component that may be electrically activated to cause at least a portion of the panel to block or transmit light impinging thereon.

17. Apparatus comprising:

a curved surface;

a sign including an electroluminescent (EL) portion to be illuminated by EL shining through the billboard sign and a portion other than the EL portion;

at least one flexible EL lamp affixed to the sign to illuminate the EL portion of the sign such that the at least one flexible EL lamp forms an advertising message, the sign and the at least one flexible EL lamp mounted to the curved surface such that the sign and the at least one flexible EL lamp wrapped around the curved surface; and a power unit coupled to the sign and including a battery to illuminate the EL lamp sign to illuminate the EL portion wherein the EL lamp sign is affixed to the EL portion of the billboard sign with a first relatively low tack adhesive and a second relatively high tack adhesive disposed along a perimeter around the first relatively low tack adhesive.

18. The apparatus of claim 17, wherein the second relatively high tack adhesive is disposed completely around the first relatively low tack adhesive.

19. The apparatus of claim 17, further comprising a photosensor to provide a control input to the power unit to turn the power unit on at an onset of darkness.

20. The apparatus of claim 19, wherein the control input is to turn the power unit off at an onset of light.

* * * * *